Figure 1:
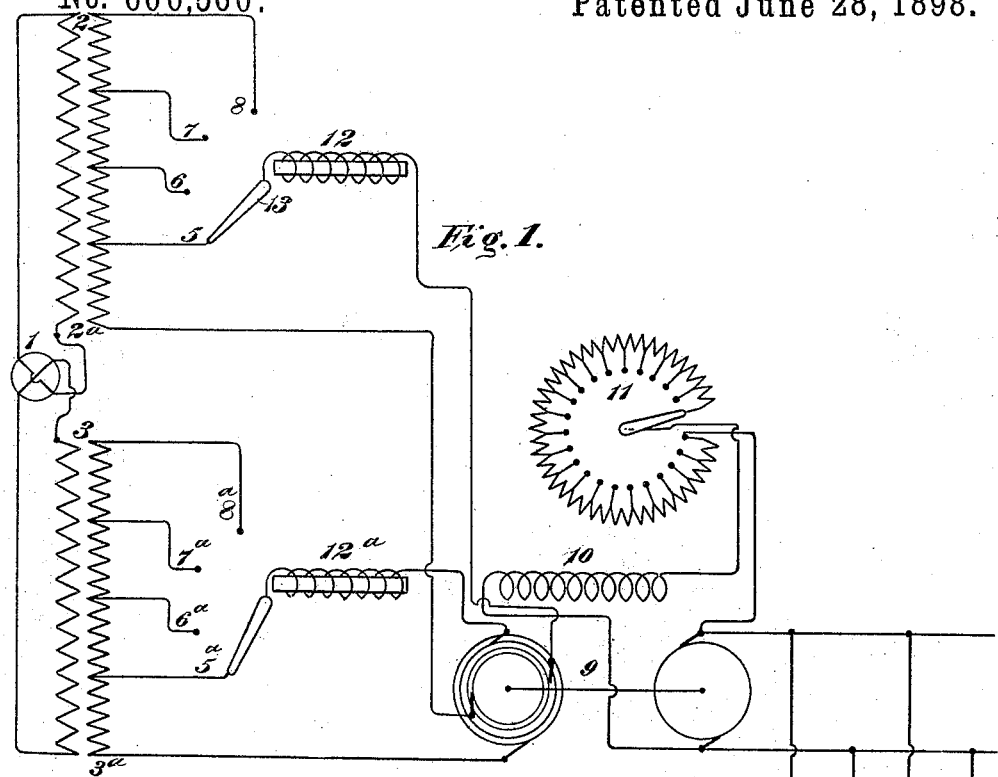
Figure 2:
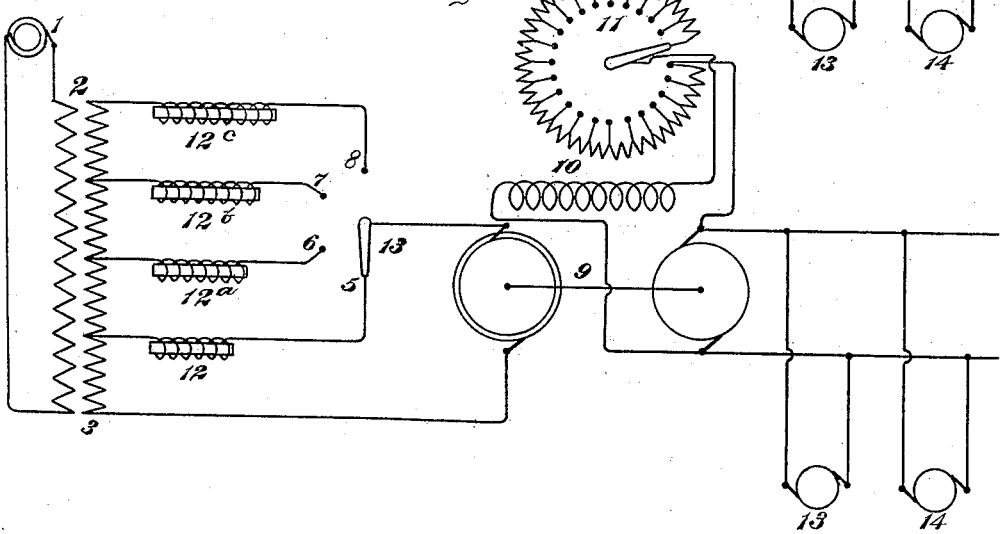

(No Model.)

B. G. LAMME.
REGULATION OF ROTARY TRANSFORMER DIRECT CURRENT ELECTROMOTIVE FORCE.

No. 606,560.           Patented June 28, 1898.

WITNESSES:
Ethan D Dodds
H. C. Tener

INVENTOR
Benjamin G. Lamme
BY
Wesley G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

REGULATION OF ROTARY-TRANSFORMER DIRECT-CURRENT ELECTROMOTIVE FORCE.

SPECIFICATION forming part of Letters Patent No. 606,560, dated June 28, 1898.

Application filed February 10, 1898. Serial No. 669,847. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in the Regulation of Rotary-Transformer Direct-Current Electromotive Force, (Case No. 770,) of which the following is a specification.

My invention relates to the transformation of alternating currents to direct currents by means of rotary transformers and the variation of potential at the direct-current terminals of the rotary transformer.

The object of my invention is to provide a method and means whereby a wide variation of potential at the direct-current terminals of a rotary transformer may be secured and whereby the operation of direct-current motors at different speeds may be effected.

The system constituting my invention is particularly useful in connection with the utilization of alternating currents for electric railways, since it permits of the employment of direct-current motors, which are more readily adapted to the great variations in speed necessary in such work, and since it provides means whereby the speed of such motors may be varied within any desired limits without variation of the resistance or circuit connections of such motors. My invention is, however, applicable and intended for use in connection with variable-speed direct-current motors irrespective of any specific application of the power developed thereby.

In the accompanying drawings, Figure 1 is a diagram of apparatus and circuits suitable for practicing my invention, and Fig. 2 is a similar diagram of a slightly-modified construction.

In Fig. 1, 1 is a two-phase alternating-current generator, and 2 and $2^a$ are stationary transformers for the respective out-of-phase circuits, the secondary windings 3 and $3^a$ of which are respectively provided with leads 5, 6, 7 and 8, and $5^a$, $6^a$, $7^a$, and $8^a$ at intervals in order that a greater or less length of each secondary may be included in circuit, according to the electromotive force desired.

9 is a rotary transformer provided with a shunt field-magnet winding 10.

11 is a rheostat connected in series with the field-magnet winding 10 and provided with means for including more or less of it in circuit, as may be desired.

12 and $12^a$ are choke-coils connected, respectively, in the circuits of the secondaries 3 and $3^a$ of the stationary transformers 2 and $2^a$, which supply the rotary transformer 9 with alternating current. The free end of choke-coil 12 is provided with a switch-arm 13, by means of which any desired number of sections in the secondary winding 3 may be included in circuit with rotary transformer 9, and the free end of choke-coil $12^a$ is provided with a similar switch-arm $13^a$, which coöperates in the same manner with the secondary $3^a$.

13 and 14 are direct-current motors connected across the circuit supplied by the direct-current end of the rotary transformer 9.

If the motors are to be used for propelling a railway-vehicle, means may obviously be provided, if desired, whereby they may be connected either in series or in parallel, such construction and arrangement being well understood in the art.

For convenience of illustration I have shown a single-phase circuit in Fig. 2; but it will be understood that the invention is not limited in any case as regards the number of phases of current. The apparatus and circuits illustrated in Fig. 2 also differ from what is illustrated in Fig. 1 as regards the number and arrangement of the choke-coils. It will be seen that in Fig. 2 I employ a series of choke-coils 12, $12^a$, $12^b$, and $12^c$, one for each division of the secondary winding, in lieu of the single coil of Fig. 1. Either arrangement is suitable for practical use; but inasmuch as the electromotive force and the torque vary with the length of transformer secondary included in circuit it may in some cases be desirable to employ a series of choke-coils of different capacity, as is indicated in Fig. 2.

The system is operated as follows: Assuming that a slow speed for the motors 13 and 14 is desired, if the rheostat 11 and the switch-arm 13 or the switch-arms 13 and 13ª, as the case may be, be in the position shown it is obvious that the transformer 2 will be supplying its lowest electromotive force and the field of the rotary transformer will be as weak as it is possible to make it with the apparatus shown. With this arrangement of parts the lagging current in the alternating-current circuit will generate in the choke-coils counter electromotive forces, which lower the alternating-current electromotive force of the rotary transformer, and thus lower the direct-current electromotive force to the minimum point.

In order to increase the direct-current electromotive force, and consequently the speed of the direct-current motors, the field-magnet of the rotary transformer may be gradually strengthened by cutting out step by step the resistance of the rheostat 11 until the field is strong enough to produce a current in the alternating-current circuit that leads the electromotive force, in which condition a component of the electromotive force generated in the choke-coil will be added to that supplied by the length of transformer secondary included in the circuit, so that the electromotive force supplied by the rotary transformer is higher than that supplied by the stationary transformer. If a still greater speed of motors is desired, another length of the stationary transformer may be included in circuit and the entire resistance of the rheostat simultaneously inserted in the field-circuit of the machine, after which the operation above described may be repeated. This operation may be continued until the entire secondary of the transformer is included in circuit and all of the resistance is cut out of the rotary-transformer field-circuit, when the maximum direct-current electromotive force, and consequently the maximum speed of the motors, will be obtained.

In order to decrease the speed of the motors, the operations above described will obviously be reversed.

It will be understood that by this method a very wide range of electromotive force, and consequently a very wide range of speed of the motors, may be obtained without the use of a regulating-rheostat in the circuit of the motors.

It will also be understood that the invention is not limited to the specific type of rotary-field-magnet winding shown nor to the specific means of varying the potential at the terminals of the secondary of the stationary transformer. It will be further understood that any suitable mechanical devices for operating the switches utilized in the system may be employed.

I claim as my invention—

1. In a system of electrical distribution, the combination with a stationary transformer having means for varying the electromotive force supplied by its secondary, of a rotary transformer receiving current from said transformer secondary, one or more choke-coils, means for connecting the same in said secondary circuit and means for varying the field-magnet excitation of the rotary transformer, whereby a wide variation of potential at the direct-current terminals may be secured.

2. In a system of electrical distribution, the combination with a stationary transformer having means for varying the electromotive force supplied by its secondary, of a rotary transformer receiving current from said transformer secondary, one or more direct-current motors receiving current from said rotary transformer, one or more choke-coils, means for including the same in the alternating-current circuit and means for varying the field-magnet excitation of the rotary transformer whereby the speed of the direct-current motor or motors may be varied within wide limits.

3. In a system of electrical distribution, the combination with a stationary transformer provided with means for varying the active length of its secondary winding, of a rotary transformer, one or more direct-current motors, a choke-coil arranged to be connected with any active length of the stationary transformer secondary and means for varying the excitation of the rotary-transformer field-magnet, substantially as and for the purpose set forth.

In testimony whereof I have hereunto subscribed my name this 8th day of February, A. D. 1898.

BENJ. G. LAMME.

Witnesses:
WESLEY G. CARR,
H. C. TENER.